United States Patent [19]

Bommart

[11] Patent Number: 5,126,514
[45] Date of Patent: Jun. 30, 1992

[54] PROCESS FOR PRODUCING AN ELECTRICAL SUPPLY RAIL

[75] Inventor: Patrick Bommart, Rueil Malmaison, France

[73] Assignee: Delachaux S.A., Gennevilliers Cedex, France

[21] Appl. No.: 579,340

[22] Filed: Sep. 6, 1990

[30] Foreign Application Priority Data

Sep. 7, 1989 [FR] France .................. 89 11710

[51] Int. Cl.$^5$ .............................................. B60M 1/02
[52] U.S. Cl. ...................... 191/22 DM; 191/29 DM; 228/243
[58] Field of Search ........ 191/22 DM, 29 R, 29 DM, 191/33 PM; 238/129, 148, 150; 228/17, 47, 235, 243

[56] References Cited

U.S. PATENT DOCUMENTS

| 588,541 | 8/1897 | Walkins | 191/22 DM |
|---|---|---|---|
| 2,612,682 | 10/1952 | Burrack | 228/243 X |
| 2,809,422 | 10/1957 | Schultz | 228/243 X |
| 3,292,256 | 12/1966 | Morgan | 228/243 X |
| 3,341,669 | 9/1967 | Martin et al. | 191/29 DM |
| 3,356,276 | 12/1967 | Robinson, Jr. et al. | 238/150 |
| 3,481,023 | 12/1969 | Jost et al. | 228/243 X |
| 3,582,575 | 6/1971 | Scofield | 191/29 DM |
| 3,602,655 | 8/1971 | Scofield et al. | 191/29 DM |
| 3,830,989 | 8/1974 | Laurent | 191/29 DM |
| 3,836,394 | 9/1974 | Kugler et al. | 191/29 DM X |
| 3,850,271 | 11/1974 | Hillmann | 191/29 DM |
| 3,872,577 | 3/1975 | Kugler et al. | 191/29 DM X |
| 4,014,417 | 3/1977 | Kugler et al. | 191/29 DM |

FOREIGN PATENT DOCUMENTS

| 0011082 | 2/1934 | Australia | 238/148 |
|---|---|---|---|
| 0464538 | 8/1928 | Fed. Rep. of Germany | 191/29 |
| 0291326 | 7/1971 | Fed. Rep. of Germany | 238/148 |
| 2435641 | 2/1975 | Fed. Rep. of Germany | 191/22 DM |
| 2546026 | 4/1977 | Fed. Rep. of Germany | 191/29 DM |
| 3104146 | 1/1982 | Fed. Rep. of Germany | 191/50 |
| 0772513 | 10/1934 | France | 238/148 |
| 2239861 | 2/1975 | France | |
| 0090224 | 6/1982 | Japan | 191/29 DM |
| 0186532 | 11/1982 | Japan | 191/29 DM |
| 0143232 | 6/1986 | Japan | 191/29 DM |
| 0143233 | 6/1986 | Japan | 191/29 DM |
| 0143234 | 6/1986 | Japan | 191/29 DM |
| 0143235 | 6/1986 | Japan | 191/29 DM |
| 1139526 | 6/1986 | Japan | 191/29 DM |
| 0207235 | 9/1986 | Japan | 191/29 DM |
| 1215637 | 8/1989 | Japan | 191/22 DM |

Primary Examiner—Frank E. Werner
Assistant Examiner—Scott L. Lowe
Attorney, Agent, or Firm—Blakely, Sokoloff, Taylor & Zafman

[57] ABSTRACT

A process for producing an electrical supply rail comprising the following steps: (a) producing a mounting body and a wearing plate between rebates of the mounting body and edges of the wearing plate, interposing a sheet of electrically conductive material between the mounting body and the wearing plate; (b) mutually superposing faces of the mounting body and the wearing plate transversely with interposition of the sheet of electrically conductive material having a fusion temperature below those of the mounting body and of the wearing plate; (c) causing the fusion of the sheet by heating and exerting a stress on the mounting body and on the wearing plate; and (d) cooling the solidification of the continuous longitudinal film.

23 Claims, 3 Drawing Sheets

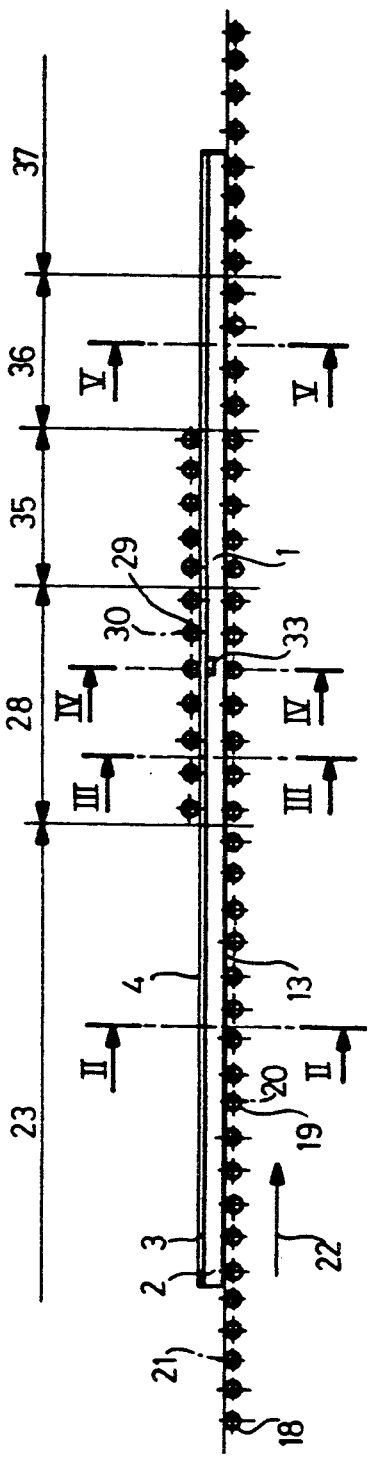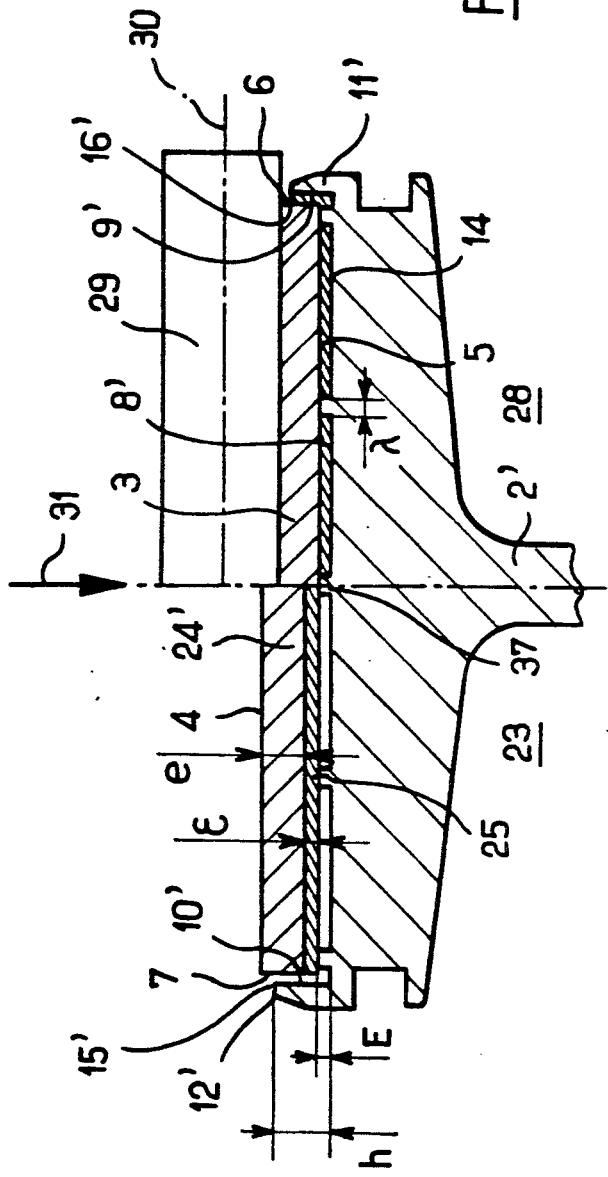

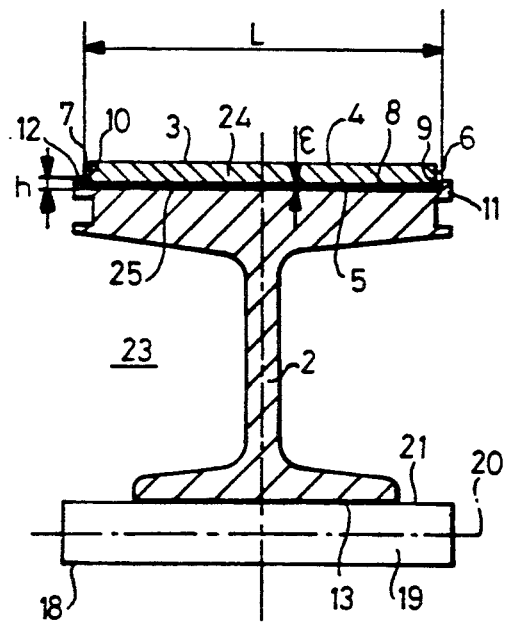
FIG_2
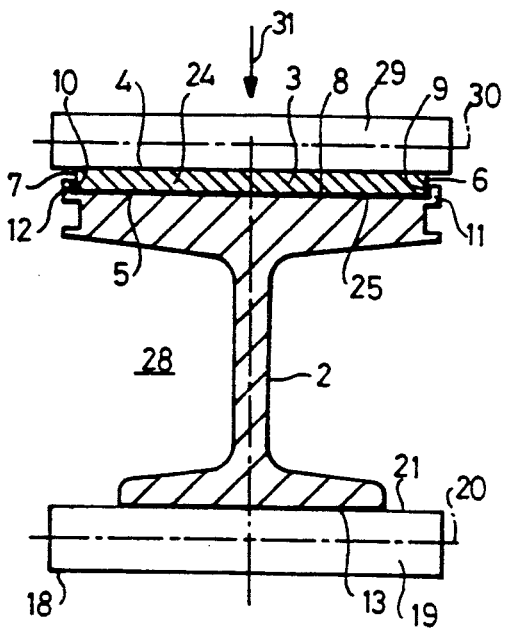
FIG_3
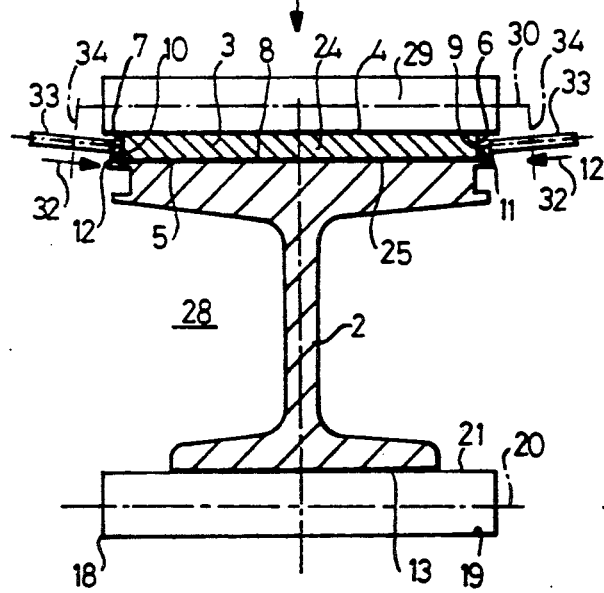
FIG_4
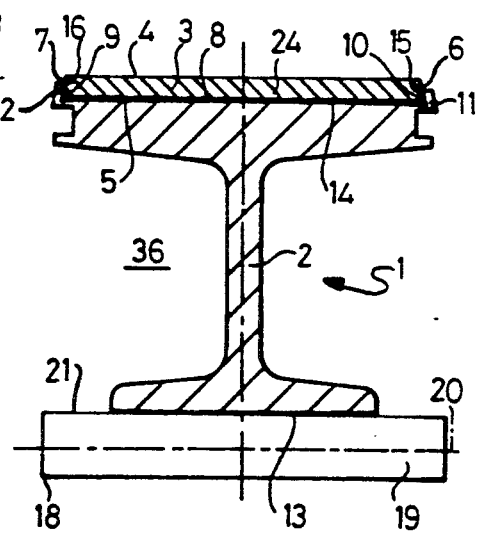
FIG_5

5,126,514

PROCESS FOR PRODUCING AN ELECTRICAL SUPPLY RAIL

BACKGROUND OF THE INVENTION

The present invention relates to a process for producing an electrical supply rail intended for ensuring the electrical supply of a locomotive by means of an electricity collector member carried by said locomotive and moving against said rail, and to an electrical supply rail which can be produced by this process.

Mention may be made, as non-limiting examples, of locomotives capable of being supplied with electricity in this way, of some railroad vehicles, some funiculars and some carousels.

Such an electrical supply rail can be produced in the form of a solid section of a single electrically conductive material, but increasingly frequently it comprises two longitudinal mutually fixed electrically conductive components having substantially constant respective cross-sections defined particularly by respective mutually complementary continuous longitudinal faces mutually juxtaposed transversely in a relationship of electrical conduction.

One of these components forms a body for mounting the supply rail on supports, such as insulators, and can itself serve for mounting protective caps on the supply rail; its cross-section is generally far larger than that of the other component and is determined, on the one hand, as a function of the desired rigidity to be imparted to the supply rail and, on the other hand, as a function of the current to be conveyed by this; to reduce its weight for a specific cross-section, this mounting body is usually produced from aluminum or an aluminum alloy.

The other component forms a wearing plate intended for interacting with the electricity collector member carried by the locomotive, and for this purpose it is produced, for example, from stainless steel which is more resistant to wear than aluminum and its alloys, but is denser, or from copper or brass; the cross-section of this second component is limited to the value necessary for ensuring a specific minimum operating time before complete wear, and its form can vary according to the particular design of the current collector member; this form can, for example, be flat between two mutually parallel plane longitudinal faces, one of which forms the abovementioned face of juxtaposition with the mounting body and the other of which is intended for interacting with the current collector member in this case consisting of a slipper; it can be V-shaped when the current collector member is a roller, these examples being in no way limiting.

A known process for producing such a two-component electrical supply rail involves producing these components separately and subsequently fixing them mutually by means of crimping; for this purpose, when it is desirable to have a flat wearing plate, the mounting body, for example produced from aluminum or an aluminum alloy, is capped by means of a longitudinal section produced, for example, from stainless steel and having a U-shaped cross-section defined by a longitudinal web forming the wearing plate and by two wings without the function of interacting with the electricity collector member and, in practice, intended to allow a mutual crimping of this U-shaped section and the mounting body; a contact grease interposed between the U-section and the mounting body makes an electrical connection distributed between them.

This known technique, when employed to produce electrical supply rails with a flat wearing plate, has a disadvantage in that, probably because of vibration phenomena and the difference between the respective coefficients of thermal expansion of the mounting body and of the section forming the wearing plate, these tend to detach from one another, with the result that, despite the presence of the contact grease, the electrical current follows elongate paths in a way detrimental to the stability of the wearing plate in time; moreover, the disadvantage of this technique is that it requires the use of a quantity of the component material of the wearing plate far larger than would be necessary for this wearing plate alone, thereby increasing both the weight per linear meter and the cost price of the supply rail.

To overcome these disadvantages, a technique which has been proposed involves longitudinally extruding the mounting body, for example made of aluminum or aluminum alloy, in contact with a flat longitudinal section, for example made of stainless steel, running longitudinally at a speed corresponding to the extrusion speed and intended for forming the wearing plate.

This technique makes it possible to obtain an effective mutual fixing, especially in terms of continuity of mutual electrical contact, between the mounting body and the wearing plate and to limit the use of the component material of the wearing plate to just the quantity necessary for ensuring that this plate has a long lifetime. However, this technique is particularly costly to put into practice, especially because of the complexity and cost of the installations which it requires.

The object of the present invention is to overcome these disadvantages by improving the abovementioned known process involving producing separately the two longitudinal components of the rail, namely the mounting body and the wearing plate, and subsequently mutually fixing them.

SUMMARY OF THE INVENTION

To achieve this, the present invention provides a process for producing an electrical supply rail intended for ensuring the electrical supply of a locomotive, such as a railroad vehicle, by means of an electricity collector member carried by said locomotive and moving against said rail, said rail comprising two longitudinal mutually fixed electrically conductive components having substantially constant respective cross-sections defined particularly by respective mutually complementary continuous longitudinal faces mutually juxtaposed transversely in a relationship of electrical conduction, by way of a mounting body and a wearing plate intended for interacting with said electricity collector member, said process involving producing the mounting body and the wearing plate separately and subsequently fixing them mutually, and being defined by the succession of steps involving:

a) producing the mounting body and the wearing plate by fashioning, on the mounting body, two continuous longitudinal rebates bordering said respective longitudinal face and, on the wearing plate, two continuous longitudinal edges bordering said respective longitudinal face, said rebates and said longitudinal face of the mounting body and said edges and said longitudinal face of the wearing plate defining mutually complementary transverse profiles, b) mutually superposing said longitudinal faces transversely with interposition of a sheet of electrically conductive material having a fusion temperature below those of the mounting body and of the wearing plate and capable of being anchored by fusion to the mounting body and to the wearing plate, by mutually juxtaposing said rebates and said edges transversely and by orienting said longitudinal face of the mounting body upwards in an approximately horizontal mean orientation, c) causing the fusion of said sheet by heating and exerting a stress on the mounting body and on the wearing plate in the direction bringing them closer together, at the same time maintaining said orientation of said longitudinal face of the mounting body, in order to bring about a migration of said material of said fused sheet between the mutually juxtaposed said rebates and said edges in the form of a continuous longitudinal film interposed between said longitudinal faces on the one hand, and between said rebates and said edges on the other hand, and d) allowing or causing the solidification of said continuous longitudinal film by cooling, at the same time maintaining said stress, in order to anchor said film continuously to the mounting body and to the wearing plate and to fix these mutually by means of said film, and then cancelling said stress.

An average person skilled in the art will easily understand that such a process makes it possible, between the mounting body and the wearing plate, to obtain a mutual fixing, without discontinuity, between their respective mutually juxtaposed longitudinal faces, and that the result of this is that their mutual electrical contact by means of these longitudinal faces is itself continuous and can preserve its continuity in time by a direct passage of electrical current between the collector member carried by the locomotive and the mounting body by way of the wearing plate and said film, even where a rail with a flat wearing plate is concerned; furthermore, it is possible to use the component material of the wearing plate in the quantities necessary solely for giving the latter its long lifetime, thereby making it possible to reduce the linear weight of the rail for a specific total cross-section of the mounting body and of the wearing plate, especially with regard to a rail with a flat wearing plate and in comparison with the abovementioned rail of which the wearing plate is formed by part of a U-section capping the mounting body.

However, the process according to the invention remains particularly economical to put into practice.

In fact, the wearing plate can retain a simple geometrical form easy to obtain from a material affording the requisite characteristics for the wearing plate, such as stainless steel or other suitable metals or metal alloys, such as, for example, copper or brass, whilst the mounting body itself is generally produced from a material suitable for the production of complex cross-sections, especially by extrusion, such as, for example, aluminum and its alloys.

Depending on the respective natures of the component materials of the mounting body, the wearing plate and said sheet, it can be expedient or necessary, between the steps a) and b), to apply to the mounting body and/or to the wearing plate, on the respective longitudinal face and on said rebates and/or said edges respectively, a treatment intended to make it easier to anchor by fusion the material of said sheet which, like the mounting body and the wearing plate themselves, is preferably metallic. This is true especially when the mounting body is made of aluminum or an aluminum alloy, the wearing plate is made of stainless steel or copper or brass and said sheet is made of soft solder, in which case, between steps a) and b), an anchoring covering for said soft solder is applied to said longitudinal faces, said rebates and said edges. By "soft solder" is meant a solder having a fusion temperature below that of aluminum which is known to be itself below that of stainless steel.

The respective longitudinal faces of the mounting body and of the wearing plate can have various forms when seen in cross-section; preferably, they are plane, and the wearing plate has, opposite its longitudinal face juxtaposed with the mounting body, a likewise plane face parallel to this and intended for interacting with the electricity collector member carried by the locomotive, such as a railroad vehicle or the like; however, especially as a function of the form of this electricity collector member and in order to give the wearing plate a constant thickness, the respective mutually juxtaposed longitudinal faces of the mounting body and of the wearing plate can likewise assume forms different from a plane form, for example concave, especially V-shaped, or convex respective cross-sections.

According to a preferred embodiment of the present invention, said respective longitudinal faces of the mounting body and of the wearing plate are of a general plane form, but at least a first of said longitudinal faces carries reliefs having the same predetermined height from said first of said longitudinal faces and coming in contact with the second of said longitudinal faces, at the same time being embedded in said material of said fused sheet during step c), so as to give said film a thickness equal to said predetermined height between said longitudinal faces. During step c), said stress can thus be exerted on the mounting body and on the wearing plate in the direction bringing them closer together, without the need to take action on the means used for this purpose in order to ensure the presence of a constant thickness of said film, since said reliefs positively limit the bringing of the wearing plate and of the mounting body close together; it is thereby possible to use simple means for exerting said stress, without risking having the wearing plate and the mounting body come closer together to such an extent that the fused material is expelled from between them completely. Said reliefs can be attached to said first longitudinal face or be produced in one piece with the mounting body or the wearing plate respectively forming this first longitudinal face; when the mounting body is produced by the extrusion of aluminum or an aluminum alloy, they are advantageously produced in one piece with this during the extrusion.

Preferably, said rebates and said edges have the same dimension from said longitudinal face of the mounting body or the wearing plate respectively; thus, during step c), the rebates and said longitudinal face of the mounting body, placed horizontally and facing upwards, form a channel retaining the material of the fused sheet against any flow-off, until step d) of solidification of the continuous longitudinal film obtained; in general, said dimension of each rebate is at most approximately equal to said dimension of the corresponding edge, although it can be otherwise; however, it is preferable if said dimension of each rebate is at most equal to said dimension of the corresponding edge, plus the thickness which the film produced during step c) has between said mutually juxtaposed longitudinal faces of the mounting body and of the wearing plate.

The process according to the invention can thus be carried out in a preferred embodiment, according to which, between steps b) and c) and/or during step c) and/or between steps c) and d), said rebates are deformed towards said edges, in such a way that said rebates have, opposite said longitudinal face of the mounting body, a respective continuous longitudinal margin in direct transverse pinching contact with said edges respectively, this preferably being completed by giving said edges, during step a), a shape favorable to a relative immobilization of the wearing plate and mounting body by gripping as a result of said transverse pinching contact, for example a shape selected from a group comprising dovetail profiles, knurled profiles and serrated profiles; such a deformation is especially easy if the mounting body possesses two longitudinal rims, each of which defines respectively one of said rebates; it makes it possible to ensure a relative immobilization of the mounting body and of the wearing plate during the solidification of the continuous longitudinal film formed between them, that is to say to ensure a continuous anchoring of this film on both of them and an exact transverse dimensioning of the rail obtained, even if the process according to the invention is carried out continuously by the joint longitudinal run of the mounting body, the wearing plate and said sheet through successive work zones carrying out said steps c) and d), as this would risk presenting difficulties in maintaining the stress on the mounting body and the wearing plate in the direction bringing them closer together during the entire phase of fusion and then cooling of the film ensuring their mutual fixing.

It will be noted that, depending on the particular case, during step b) the respective transverse faces of a single mounting body and of a single wearing plate can be mutually superposed with the interposition of said sheet, but it is likewise possible, during this step b), mutually to superpose, with the interposition of said sheet, the respective transverse faces of a single mounting body, on the one hand, and of a plurality of longitudinally juxtaposed wearing plates defining longitudinal plays between them, on the other hand; this latter possibility is useful in that it makes it possible to prevent the differences in the coefficients of thermal expansion between the respective component materials of the mounting body and of the wearing plate from bringing about a general bending of the rail, by separating from one another the deformations which can occur between each wearing plate and the mounting body.

Likewise for the purpose of preventing the effects of the differences in the coefficients of thermal expansion between the respective component materials of the mounting body and of the wearing plate on the geometry of the rail, and when the component material of the mounting body has both a coefficient of thermal expansion higher than that of the component material of the wearing plate and a resistivity lower than that of the latter material, as occurs when the mounting body is made of aluminum or an aluminum alloy and the wearing plate is made of stainless steel, the heating provided in step c) can advantageously be carried out by high-frequency induction; this results, in fact, in a smaller rise in temperature of the mounting body in comparison with the wearing plate, and the respective temperature rises experienced can result in substantially identical expansions during the heating, with the result that the disappearance of these expansions during the subsequent cooling, that is to say during step d), preserves identical dimensions, especially longitudinal, in the mounting body and the wearing plate, and that the rail does not bend.

Insofar as the process according to the invention makes it possible to obtain an electrical supply rail differing in its structure from the electrical supply rails known hitherto, the present invention extends to an electrical supply rail intended for ensuring the electrical supply of a locomotive, such as a railroad vehicle, by means of an electricity collector member carried by said locomotive and moving against said rail, said rail comprising two longitudinal mutually fixed electrically conductive components having substantially constant respective cross-sections defined particularly by respective mutually complementary continuous longitudinal faces mutually juxtaposed transversely in a relationship of electrical conduction, by way of a mounting body and a wearing plate intended for interacting with said electricity collector member,
wherein the mounting body has two continuous longitudinal rebates bordering said respective longitudinal face, the wearing plate has two continuous longitudinal edges bordering said respective longitudinal face, said rebates and said edges are mutually juxtaposed transversely, and between said longitudinal faces on the one hand, and between said rebates and said edges on the other hand, is interposed a continuous longitudinal film of electrically conductive material anchored continuously to the mounting body and to the wearing plate and mutually fixing these.

Moreover, this rail can have various structural characteristics arising as a result of the preferred embodiments of the process according to the invention which have been described above.

Other characteristics and advantages of the process and electrical supply rail according to the invention will emerge from the following description relating to non-limiting illustrative embodiments and from the accompanying drawings which form an integral part of this description.

BRIEF DESCRIPTION OF THE DRAWINGS

FIG. 1 illustrates diagrammatically, in side elevation, an installation for carrying out the process according to the invention continuously.

FIGS. 2 to 5 illustrate respectively successive steps in carrying out the process, in sectional views taken in planes designated respectively by II—II, III—III, IV—IV and V—V in FIG. 1.

FIG. 9 relates to an alternative embodiment of the rail illustrated in FIG. 6, two successive steps in the production of which it illustrates, its left and right halves showing respectively, on a larger scale, views analogous to that of FIG. 2 and to that of FIG. 3.

DETAILED DESCRIPTION OF PREFERRED EMBODIMENT OF THE INVENTION

Figure 6:
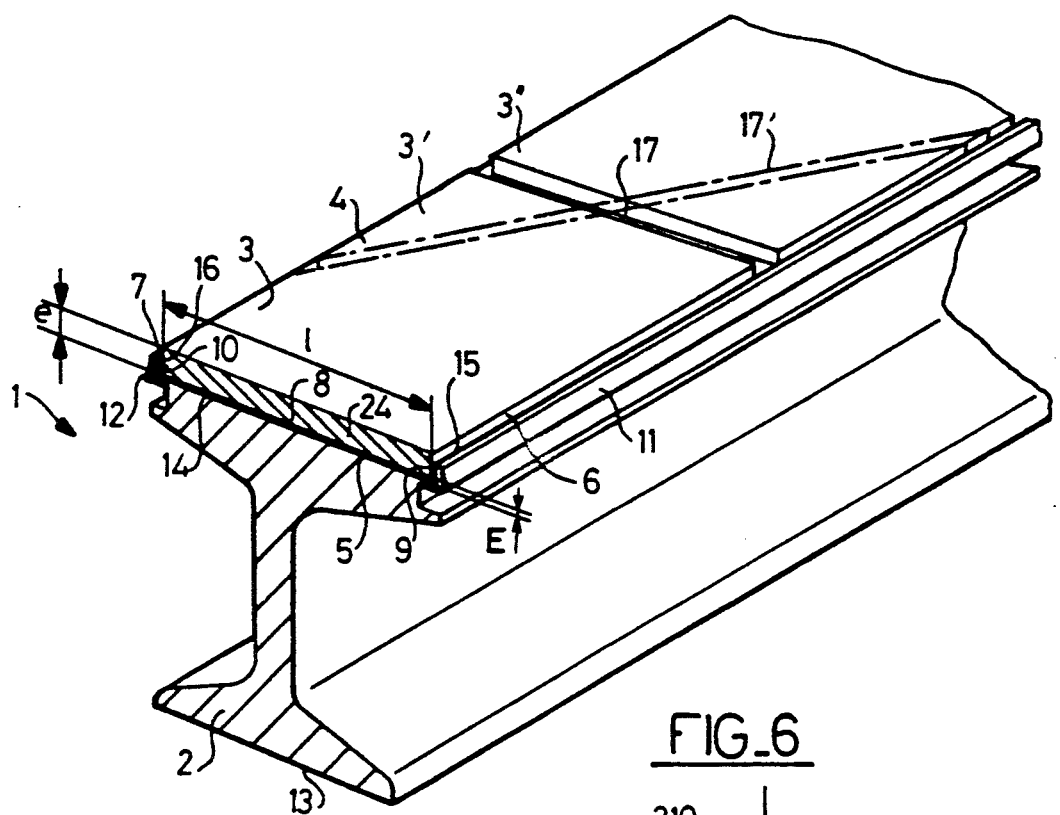
FIG. 6 shows a perspective view of the rail obtained by carrying out the process illustrated in FIG. 1 (partially in the form of dot-and-dash lines) and according to an alternative embodiment of this process (in unbroken lines).

Reference will first be made to FIGS. 1 to 6 which illustrate the production of a longitudinal electrical supply rail 1 comprising two longitudinal main components mutually juxtaposed transversely and mutually fixed, by way of a body 2 produced, for example, in the form of a longitudinal aluminum or aluminum alloy section and a wearing plate 3 produced, for example, in the form of a stainless-steel strip, both having a constant cross-section.

As regards the wearing plate 3, this cross-section is rectangular and is defined by two longitudinal, plane and mutually parallel main faces 4 and 5 and by two longitudinal, plane and mutually parallel edges 6, 7 connecting the faces 4 and 5 to one another and oriented at right angles relative to these; the edges 6 and 7 are preferably knurled or serrated or given any other shape favorable for immobilizing the wearing plate 3 by the pinching of its edges 6, 7; alternatively or additionally, they could converge from the face 5 towards the face 4 and thus impart a dovetail profile to the plate 3. The faces 4 and 5 are mutually spaced at a distance e forming the thickness of the wearing plate 3, and the first of them is intended for receiving a current collector member (not shown) carried, for example, by a railroad vehicle and intended for moving longitudinally on this face 4 to ensure current collection, whilst the second is juxtaposed flat with a matching plane longitudinal face 8 of the body 2 and fixed to this face 8 without discontinuity, as will emerge from the rest of the description, in order to also ensure uniform electrical conduction between the faces 5 and 8; the edges 6 and 7 are themselves mutually spaced at a distance or width 1 far larger than e. The thickness e is, for example, of 7 the order of 2.5 mm for a width 1 of the order of 55 mm, these examples being in no way limiting The plane longitudinal face 8 which, on the body 2, confronts the face 5 of the wearing plate 3 has itself a transverse dimension L and a width of a few tenths of a millimeter, for example 2/10 mm, larger than the width 1 of the wearing plate 3, in particular the face 5 of the latter; as emerges from an examination of FIG. 2, this width L is measured between two plane longitudinal rebates 9, 10 which border the face 8 transversely and are oriented perpendicularly to this; in actual fact, the two rebates 9, 10 are defined by two longitudinal rims 11, 12 which the body 2 has projecting relative to its face 8 transversely on either side of the latter respectively; the rims 11, 12 and the rebates 9, 10 have, perpendicularly to the face 8, a dimension h or height which could be greater than the thickness e of the wearing plate 3 but is preferably at most equal to this thickness e and even, as illustrated, less than this thickness e by a value of the order of a few tenths of a millimeter, to prevent any risk of contact between the moving current collector member carried, for example, by the railroad vehicle and the body 2. Preferably, the value of h is thus of the order of 50% to 100% of that of e, especially of the order of 80% of that of e, these values being given only by way of non-limiting example.

Moreover, the body 2 can have any cross-section within the present invention, this being determined in a known way by an average person skilled in the art, so that the body 2 is suitable for the mounting of the rail 1 on an appropriate support by means of insulators (not shown), and for the mounting of any desired protection (not shown) on the rail 1; furthermore, this cross-section is such that the rail 1, considered as a whole, has an overall cross-section related to the intensity of the current which it is to carry; as a non-limiting example, the body 2 illustrated possesses an I-shaped cross-section having, opposite the face 8, a likewise plane longitudinal face 13 parallel to the face 8 and oriented in the opposite direction to the face 8.

Under these conditions, referring to the finished rail 1, the face 5 of the wearing plate 3 and its edges 6 and 7 are placed opposite the face 8 of the body 2 and the rebates 9 and 10 of the body respectively, but maintaining a continuous play of a thickness E much smaller than the thickness e and the height h, that is to say of the order of a tenth of a millimeter or a few tenths of a millimeter, for example of the order of 1.5 to 2 tenths of a millimeter, this play being filled completely with a continuous longitudinal film 14 of a material which both mutually fixes the wearing plate and body 2 without discontinuity between their faces 5 and 8 thus placed opposite one another and between the edges 6, 7, on the one hand, and the rebates 9, 10 confronting them, on the other hand, and ensures a likewise continuous electrical conduction between the faces 5 and 8 and between the edges 6 and 7 on the one hand and the rebates 9 and 10 on the other hand. In the example in which the body 2 is produced from aluminum or an aluminum alloy and the wearing plate 3 from stainless steel, the component material of the film 14 is a soft solder, that is to say a solder having a fusion temperature below that of the aluminum or aluminum alloy forming the body 2, itself being below that of the stainless steel forming the wearing plate 3. A tin/lead alloy can be mentioned as a non-limiting example of such soft solder.

The film 14 also ensures a continuous seal between the face 8 and the rebates 9 and 10 of the body 2, on the one hand, and the face 5 and the edges 6 and 7 of the wearing plate 3, on the other hand, thus preventing any introduction of moisture between the wearing plate 3 and the body 2 and therefore any risk of a cell effect which could occur as a result of this. Preferably, as emerges from an examination of FIG. 5, the rebates 9 and 10, despite their general planeness and the fact that they are generally perpendicular to the face 8, have a slight curvature in the direction bringing them closer together, in such a way that, opposite their junction with the face 8, each of them possesses, in continuous transverse contact with the respective corresponding edge 6, 7 of the wearing plate 3, a respective straight longitudinal margin 15, 16 likewise delimiting the film 14 when, as illustrated, the height h of the rebates 9 and 10 is less than the thickness e of the wearing plate 3 or when this thickness and this height are equal or when the height h is greater than the thickness e by a value not exceeding the thickness equal to E which the film 14 has between the faces 5 and 8.

According to one embodiment of the invention represented partially by dot-and-dash lines in FIG. 6, the rail 1 can take the form of longitudinal portions on which the body 2 and the wearing plate 3 extend longitudinally without discontinuity; however, as represented by unbroken lines in FIG. 6, a plurality of longitudinal portions 3', 3", of the wearing plate 3 can correspond to the same longitudinal body portion 2, leaving between them longitudinal plays 17 or 17'in the region of which the film 14 can have, if appropriate, with reference to the face 8 of the body 2, a thickness identical to the height h of the rebates 9, 10, when h is less than or equal to the thickness e of the wearing plate 3, plus, if appropriate, the thickness which the film 14 also has between the faces 5 and 8. As represented by unbroken lines at 17, the longitudinal plays 17 or 17' can take the form of straight bands oriented transversely, that is to say perpendicularly to the longitudinal direction of the rail 1, or, as represented by dot-and-dash lines at 17', the form of straight bands oriented obliquely relative to the longitudinal direction of the rail 1, or any other especially non-straight form and any other orientation.

A rail 1 so designed can advantageously be produced by means of an installation of the type shown diagrammatically in FIG. 1, by reference to which the successive steps of producing such a rail 1 will be described.

The installation illustrated in FIG. 1 is suitable for continuous production of the rail 1 in portions of any length.

The installation illustrated in FIG. 1 comprises particularly a conveyor 18 of the type with rollers 19 mounted freely rotatably about respective mutually parallel horizontal axes 20, so as to form in the upward direction a plane and horizontal upper face 21 of the conveyor 18; driving means (not shown) known per se to an average person skilled in the art make it possible to move a mounting body 2, resting with its face 13 on the rollers 19, that is to say the face 21 of the conveyor, longitudinally and continuously in a direction 22 which will subsequently serve as a reference for the ideas of upstream and downstream.

In an upstream zone 23 of the conveyor 18, the body 2 of a rail 1 to be produced is deposited on the face 21 of the conveyor, in such a way that the direction 22 is oriented longitudinally with reference to this body 2; the body 2 is thus deposited with its face 13 on the face 21 of the conveyor 18, so that its face 8 is arranged horizontally and facing upwards and so that the rebates 9 and 10 thereby define with it a longitudinal channel 24, as shown in FIG. 2; advantageously, the face 8 and the rebates 9 and 10 of the body 2 have previously, that is to say before the body 2 is deposited on the face 21 of the conveyor 18, undergone a treatment intended to make it easier to anchor the film 14 on them, for example in the form of a deposit of nickel and/or copper and then, if appropriate, of tin, when the film 14 is made of an alloy of tin and lead, as mentioned above, and the body 2 of aluminum, this example being in no way limiting; this deposit can be carried out by any known means, for example by schoopage or electrolysis, electrolysis by the known process called "pad" electrolysis being preferred in that it can be limited to the face 8 and to the rebates 9 and 10 of the body 2.

A sheet 25 of the component material of the film 14 rests on the face 8 of the body 2 in the channel 24, namely, in the example mentioned above, a foil of tin/lead alloy having a uniform thickness $\epsilon$ smaller than the height h of the rebates 9 and 10 and the thickness e of the wearing plate 3, but larger than the thickness e of the film 14 of the rail to be produced, and extending transversely from one of the rebates 9 and 10 of the body 2 to the other over the entire distance L separating these rebates 9 and 10 from one another; the thickness $\epsilon$ is calculated in such a way that, when multiplied by the distance L, it corresponds to a cross-section of the sheet 25 that is substantially identical to or, if appropriate, slightly larger than that of the film 14 of the rail 1 to be produced; it is, for example, of the order of a few tenths of a millimeter; according to an alternative version (not shown), the sheet 25 could have, between the rebates 9 and 10, a dimension smaller than L, but its thickness $\epsilon$ would nevertheless be calculated so as to maintain the abovementioned relation between the respective crosssections of the sheet 25 and film 14.

Furthermore, on the sheet 25 rests the wearing plate 3 produced either in one piece, having longitudinal dimensions equal to those of the body 2, or in the form of longitudinal portions 3', 3", having respective longitudinal dimensions smaller than those of the body 2 and mutually spaced longitudinally, in such a way that the face 5 rests on the sheet 25, and by way of this on the face 8, and that the edges 6 and 7 are placed respectively opposite the rebates 9 and 10, maintaining a substantially identical transverse play in relation to these rebates. Preferably, the wearing plate 3 or each portion 3', 3", of this have previously been subjected, on the face 8 and on the edges 6 and 7 or at least over a zone of these intended to come opposite the rebates 9 and 10, to a treatment intended to make easier the subsequent anchoring of the component material of the sheet 25 and of the film 14; when the sheet 25 is produced from a tin/lead alloy and the wearing plate 3 or each portion 3', 3", of this from stainless steel, this treatment can consist of tinning by any one of the processes mentioned above in respect of the similar treatment of the body 2, preferably by pad electrolysis limited to the face 5 and to the edges 6 and 7 of the wearing plate 3 or of each portion 3', 3", of the latter.

If appropriate, in a way not shown in FIG. 2, the superposition of the body 2, the sheet 25 and the wearing plate 3 or each portion 3', 3", of this can be stabilized by a crimping of the edges 6 and 7 between the rebates 9 and 10 as a result of a deformation of the rims 11 and 12 in the direction bringing them closer together and of a shaping of the edges favorable to a relative immobilization brought about by the contact which is thus made between the rebates and the edges; however, this crimping must remain sufficiently light to avoid generating a gripping effect between the rebates and the edges, so as essentially to oppose a creeping of the wearing plate 3 in the form of portions 3', 3", thereof in relation to the mounting body 2 during the execution of the rail production process, without preventing, during a later step in the execution of the process which will be described with reference to FIG. 3, the possibility of driving the wearing plate 3 or each portion 3', 3", further in between the rebates 9 and 10 by means of a suitable stress 31.

Subsequently, the body 2, the sheet 25 and the wearing plate 3 or the portions 3', 3", of this move in unison in the direction 22 over the upper face 21 of the conveyor 18 which delivers them from the upstream zone 23 or feed zone to a zone 28 where heating to a temperature higher than the fusion temperature of the component material of the sheet 25, but lower than the lowest of the fusion temperatures of the body 2 and of the wearing plate 3 or portions 3', 3", of this respectively, that is to say, in practice, below the temperature of the aluminum or aluminum alloy forming the body 2 in the chosen example, for example by high-frequency induction heating means, causes a fusion of the component material of the sheet 25 and a controlled pressing of the wearing plate 3 or portions 3', 3" of this against the body 2, as shown in FIG. 3.

For this purpose, in the entire fusion and pressing zone 28, opposite the rollers 19 of the conveyor 18, above its upper face 21, other rollers 29 are arranged, mounted freely rotatably about respective horizontal axes 30 parallel to the axes 20 of the rollers 19, and the mutual spacing of the respective axes 20 and 30 of the rollers 19 and 29 in the zone 28 can be adjusted in such a way that, as it passes through zone 28, the wearing plate 3 or each portion 3', 3" of this is stressed in a vertical transverse direction 31 descending towards the body 2 and thus comes closer to the face 8, at the same time forcing the material of the fused sheet 25 to migrate between the rebates 9 and 10 of the body 2 and the edges 6 and 7 of the wearing plate 3 or portions 3', 3" of this, and also between these possible portions 3' and 3"; by an appropriate adjustment of the mutual spacing of the respective axes 20 and 30 of the rollers 19 and 29, this coming closer together is of such an extent that the migration of the material of the fused sheet 25 between the rebates 9 and 10 of the body 2 and the edges 6 and 7 of the wearing plate 3 or portions 3'and 3" of this takes place without discontinuity over the entire height h of the rebates 9 and 10, if this height h is at most equal to the thickness e of the wearing plate 3, plus, if appropriate, the thickness E of the film 14 to be produced, without a discontinuity thereby occurring in the component material of the sheet 25 between the faces 5 of the wearing plate 3 or portions 3', 3" of this and the face 8 of the body 2, that is to say especially without any direct mutual contact between the faces 5 and 8.

According to an alternative version (not shown), the rollers 29 can be replaced by other means suitable for stressing the wearing plate or each portion 3', 3" of this towards the body 2, in order to cause the abovementioned bringing closer together of the faces 5 and 8 and the abovementioned migration of the material of the fused sheet 25. For example, they could be replaced by a pressing plate, made in particular of graphite, in sliding contact with the face 4 of the wearing plate 3 or each portion 3', 3" of this.

According to another alternative version illustrated in FIG. 9, showing an identical wearing plate 3, the various parts of which keep the same reference numerals, and the sheet 25, and showing a mounting body 2' which has many similarities to the mounting body 2 and the various parts of which keep the same reference numerals with the exponent ', the exact relative positioning of the wearing plate 3 and the body 2' during the passage through the fusion and pressing zone 28 can be made easier by the presence on at least one of the faces 5 and 8', which are otherwise of general plane form, of localized reliefs 37 which, on this face, form projections of the same height equal to the thickness E of the film 14 to be produced. In the example illustrated, these localized reliefs 37 are fashioned on the face 8' by being produced in one piece with the body 2', especially by extrusion, in the form of five continuous longitudinal ribs of rectangular cross-section, of which a first or central rib is equidistant from the rebates 9' and 10" of which two other or lateral ribs are placed respectively in the immediate vicinity of the rebate 9' and in the immediate vicinity of the rebate 10', but maintaining a continuous play relative to these, and of which two other or intermediate ribs are placed between the central rib and respectively one or the other of the lateral ribs; parallel to the face 8', these ribs 37 have a transverse dimension which is small in relation to the widths 1 and L, for example of the order of 1.0 to 1.5 mm.

Thus, in the upstream zone 23 of the conveyor 18, as shown in the left half of FIG. 9, the procedure described with reference to FIG. 2 is adopted, except that instead of resting directly on the face 8', the sheet 25 rests on the localized reliefs 37 formed by the ribs of this face 8'. The remaining procedure is likewise identical to what was described with reference to FIG. 3, but it can be seen that, during the passage through the fusion and pressing zone 28, as shown by the right half of FIG. 9, the wearing plate 3 descending towards the body 2' and thereby causing the migration of the component material of the sheet 25, under the effect of the rollers 29 or other means replacing them, comes to bear with its face 5 on the localized reliefs 37 formed by the ribs of the face 8', that is to say occupies in relation to the body 2' a position in which the faces 5 and 8' are mutually spaced by E, thus leaving between them a play filled completely by the material of the fused sheet 25, in which the localized reliefs 37 are embedded and which likewise fills the play between each rebate 9', 10' and the respective corresponding edge 6, 7 of the wearing plate 3.

Of course, this embodiment of the localized reliefs 37 is only a non-limiting example, and in particular these localized reliefs could be fashioned on a face, corresponding to the face 5, of a wearing plate otherwise identical to the wearing plate 3, which would then rest by means of these on the sheet 25 resting in that case directly on the face 8 of the body 2 in the upstream zone 23 of the conveyor 18; moreover, instead of being produced in one piece with the mounting body 2' or with the wearing plate 3, they could be attached, if appropriate freely, to the face 8 of a body 2 or to the face 5 of a wearing plate 3.

Subsequently, in the fusion and pressing zone 28, when the component material of the sheet 25 is still in the fused state, as shown in FIG. 4, during the run in the direction 22 transverse pushes 32 are preferably exerted on the rims 11 and 12 of the body 2 or on the rims 11' and 12' of the body 2' in a way not shown, in the direction bringing them closer together so as to ensure a firm crimping of the wearing plate or portions 3', 3" of this between the rims 11, 12 or 11', 12' or to strengthen the crimping that may have been carried out before the fusion of the component material of the sheet 25; for example, for this purpose, the running body 2 or 2' passes between crimping rollers 33 mounted freely rotatably about approximately vertical axes 34 respectively on either side of the necessary passage of the body 2 or 2', in the upper region of the rims 11, 12 or 11', 12' of the latter; this crimping brings about the mutual contact of the rebates 9, 10 or 9', 10' of the body 2 or 2' and of the edges 6, 7 of the wearing plate 3 or portions 3', 3" of this, described above, along a continuous straight longitudinal margin 15, 16 or 15', 16' of the rebates 9, 10 or 9', 10' which is opposite the junction of these with the face 8 or 8', if the height h is at most equal to the thickness e, plus, if appropriate, the thickness E of the film 14 to be produced.

By means of this crimping, on the one hand it is certain that the component material of the fused sheet 25 completely fills the channel 24 or 24' between the body 2 or 2' and the wearing plate 3 or the portions 3', 3" of this, and on the other hand it is certain that there is a constant strict relative positioning of the wearing plate 3 or portions 3', 3" of this and of the body 2 or 2', despite the fact that the rollers 29 are laid only locally onto the face 4 of the wearing plate 3 or portions 3', 3" of this, at the risk of giving rise in the latter to wave displacements which transmit to the component material of the fused sheet 25 during the simultaneous run of the body 2 or 2', the wearing plate 3 or portions 3', 3" of this and the component material of the fused sheet 25 in the fusion and pressing zone 28; in other words, it is certain that the exact relative positioning imparted to the wearing plate 3 or to the portions 3′, 3″ of this and to the body 2 or 2′ in the fusion and pressing zone 28 is definitive.

A possible excess of component material of the fused sheet 25, which may have been caused to overflow from the channel 24 or 24′, is wiped off by means (not shown) provided for this purpose in the zone 28 downstream of the crimping rollers 33; it will be seen that, to prevent such an excess from soiling the face 4 of the wearing plate 3 or of each portion 3′, 3″ of this, it is preferable if the selected height h is smaller than the thickness e plus the thickness E of the film 14 to be produced.

The rail 1 then has its final construction and shape, illustrated in FIG. 5 as regards a body of which the face 8 is devoid of localized reliefs 37, and leaves the fusion and pressing zone for a zone 35 of cooling with pressing; in this entire zone, not shown in detail, rollers 29 in all respects similar to those of the fusion and pressing zone 28 or of the equivalent means, such as a pressing plate, are arranged above the face 21 of the conveyor 18, maintaining the same spacing of their axes 30 from the axes 20 of the rollers 19 of the latter as in the fusion and pressing zone 28, but the component material of the sheet 25 is allowed to solidify gradually into the form of the film 14, or this solidification is brought about by forced cooling; subsequently, the rail 1, continuing to move in the direction 22, passes through a zone 36 of cooling without pressure, as shown in FIG. 5, thus making it possible to complete the solidification of the film 14, and then the rail 1 enters a zone 37 of discharge towards storage areas; in this zone 37, if the wearing plate 3 has been deposited in the form of a single portion on the sheet 25, itself resting on the body 2 or 2′, whereas the intention is for a plurality of longitudinal and longitudinally juxtaposed wearing-plate portions 3′, 3″ to correspond to a single longitudinal body 2 or 2′, a limited transverse grooving can be made, in this zone 37, in the continuous wearing plate 3 and in the rims 11, 12 or 11′, 12′ of the body 2 or 2′, making it possible to separate the portions 3′, 3″ of wearing plate 3 from one another, whilst at the same time preserving the general continuity of the body 2 or 2′.

In the cooling zones 35 and 36 there can be shaping means which are not shown, but which can easily be understood by an average person skilled in the art, for guaranteeing that the straightness of the body 2 or 2′ is preserved and for thereby ensuring that the rail 1 is straight.

In the finished rail 1, the film 14 is the chief part responsible for the mutual fixing of the wearing plate 3 in the form of the portions 3′, 3″ and of the mounting body 2 or 2′, the crimping of the rebates 9, 10 or 9′, 10′ on the edges 6, 7 performing only a secondary function in this mutual fixing; when at least one 8′ of the faces 5 and 8′ has localized reliefs 37, as described with reference to FIG. 9, these localized reliefs, ensuring that the film 14 has a uniform thickness as a result of the mutual bearing of the wearing plate 3 and of the mounting body 2′ until this film 14 solidifies, remain embedded in the latter after its solidification and via this remain in contact with the other 5 of these longitudinal faces 5, 8′.

Of course, the embodiment of the invention just described is only a non-limiting example, in relation to which many alternative versions can be provided, without thereby departing from the scope of the present invention.

These alternative versions can relate particularly to the component materials of the body 2 or 2′, of the wearing plate 3 or its portions 3′, 3″ and of the film 14 or of the sheet 25 forming it, after fusion and solidification; in particular, although a wearing plate 3 and wearing-plate portions 3′, 3″ made of stainless steel have been described, all the advantages of the present invention will be afforded with wearing plates or wearing-plate portions produced from other suitable metals or metal alloys, such as, for example, copper or brass.

These alternative versions can also relate to the respective forms of the body 2 or 2′ and of the wearing plate 3 or its portions 3′, 3″.

Figure 7:
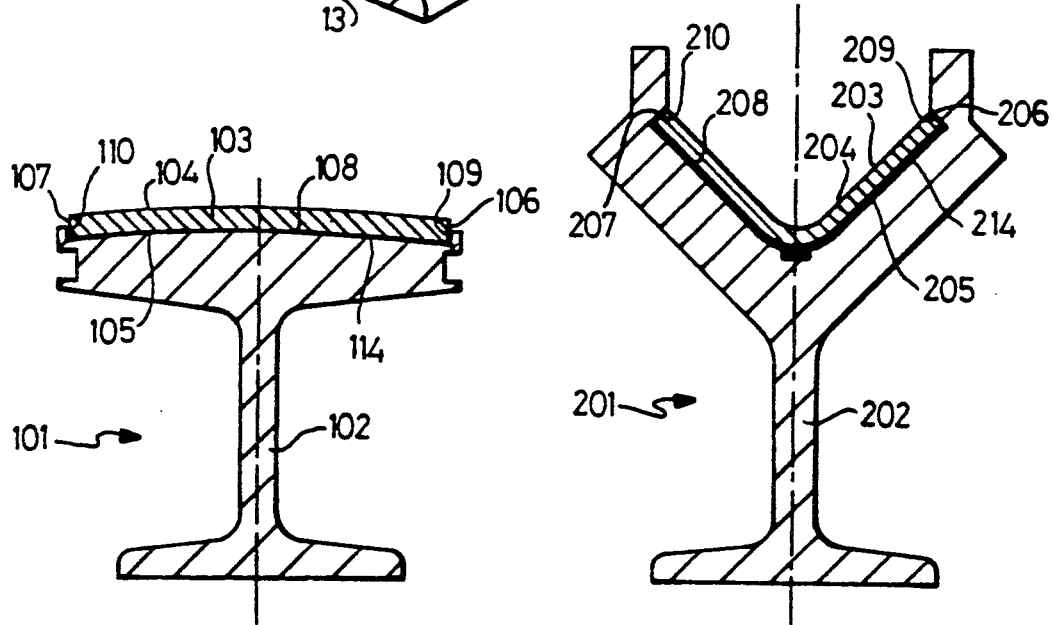
FIGS. 7 and 8 show sectional views, similar to that of FIG. 5, of other non-limiting examples of an electrical supply rail which can be obtained by carrying out the process according to the invention.

Thus, as a non-limiting example, FIG. 7 illustrates a cross-section of a longitudinal rail 101 which is produced according to the present invention and the longitudinal body 102 of which is in all respects similar to the body 2 described above, except that its longitudinal face 108 corresponding to the face 8 of the body 2 is convexly rounded between the longitudinal rebates 109, 110 which themselves are respectively similar to the rebates 9 and 10; the wearing plate 103 is itself similar in all respects to the wearing plate 3 described above, except that its faces 104, 105 corresponding respectively to the faces 4 and 5 of the wearing plate 3 are respectively convex and concave, the face 105 thus placed opposite the face 108 maintaining a continuous play in relation to the latter in the same way as does the face 5 of the wearing plate 3 in relation to the face 8 of the body 2; thus, between these faces 105 and 108 and between the rebates 109 and 110, on the one hand, and the edges 106 and 107 of the wearing plate 103, on the other hand, which are respectively similar to the edges 6 and 7 of the wearing plate 3, is interposed a continuous film 114 ensuring both the mutual fixing of the wearing plate 103 and the body 102 and electrical continuity between them; preferably, the other arrangements described with reference to the rail 1 are likewise adopted again, particularly the mutual crimping of the wearing plate 103 and body 102 and the possible subdivision of the plate 103 into a plurality of longitudinal portions mutually spaced longitudinally.

Figure 8:
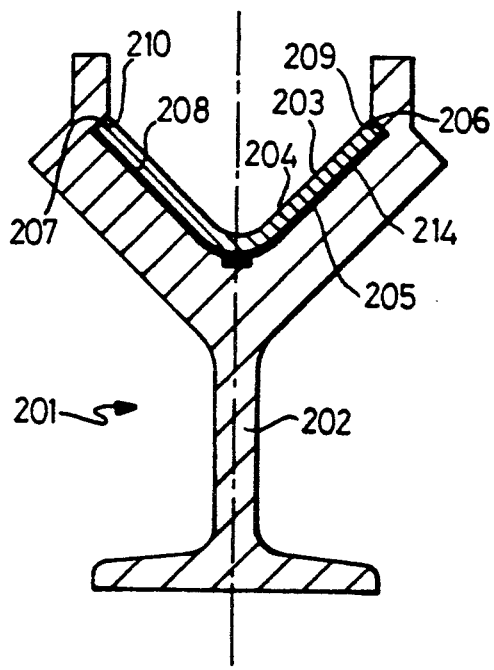

As regards FIG. 8, this shows a rail 201, the body 202 of which is similar to the body 2, except that, between rebates 209 and 210 respectively similar to the rebates 9 and 10, it has instead of the plane face 8 a recessed face 208 of V-shaped upwardly concave cross-section, when seen in cross-section, as in FIG. 10; in this case, the wearing plate 3 is replaced by a wearing plate 203 having the general form of an angle, delimited by two faces in a V 204, 205 corresponding respectively to the faces 4 and 5, particularly in that the face 205 is placed opposite the face 208, but maintains in relation to the latter a continuous play filled with a film 214 comparable in all respects to the film 14; in this case too, the various arrangements described with reference to the rail 1 can be adopted again, particularly a crimping of edges 206, 207 of the wearing plate 203, respectively similar to the edges 6 and 7 of the wearing plate 3, between the rebates 209 and 210 of the body 202; likewise, in this case too, the wearing plate 203 could be replaced by a plurality of longitudinal wearing-plate portions mutually juxtaposed longitudinally, with a longitudinal play being maintained between them.

Of course, in these alternative versions, it would also be possible for at least one of the longitudinal faces 105 and 108 or 205 and 208, preferably the longitudinal face 108 or 208 of the mounting body 102, 202, to have localized reliefs similar to the localized reliefs 37 to ensure that the film 114 or 214 has a uniform thickness, in a way which is not illustrated, but which can easily be understood by an average person skilled in the art.

I claim:

1. A process for producing an electrical supply rail (1, 101, 201), wherein said rail (1, 101, 201) includes two longitudinal electrically conductive components (2, 2', 3, 102, 103, 202, 203) having substantially constant respective cross-sections defined particularly by respective mutually complementary continuous longitudinal faces (5, 8, 8', 105, 108, 205, 208) mutually juxtaposed transversely in a relationship of electrical conduction, by way of a mounting body (2, 2', 102, 202) and a wearing plate (3, 103, 203) intended for interacting with an electricity collector member, and bound together through fusion of a sheet of electrically conductive material, said process comprising the steps of:

(a) producing the mounting body (2, 2', 102, 202) and the wearing plate (2, 103, 203) by fashioning, on the mounting body (2, 2', 102, 202), two continuous longitudinal rebates (9, 10, 9', 10', 109, 110, 209, 210) bordering said respective longitudinal face (8, 8', 108, 208) and, on the wearing plate (3, 103, 203), two continuous longitudinal edges (6, 7, 106, 107, 206, 207) bordering said respective longitudinal face (5, 105, 205) of the wearing plate (3, 103, 203) defining mutually complementary transverse profiles.

(b) mutually superposing said longitudinal faces (5, 8, 8', 105, 108, 205, 208) transversely with interposition of a sheet (25) of electrically conductive material having a fusion temperature below those of the mounting body (2, 2', 102, 202) and of the wearing plate (3, 103, 203) and capable of being anchored by fusion to the mounting body (2, 2', 102, 202) and to the wearing plate (3, 103, 203), by mutually juxtaposing said rebates (9, 10, 9', 10', 109, 110, 209, 210) and said edges (6, 7, 106, 107, 206, 207) transversely and by orienting said longitudinal face (8, 8', 108, 208) of the mounting body (2, 2', 102, 202) upwards in an approximately horizontal mean orientation, (c) causing the fusion of said sheet (25) by heating and exerting a stress on the mounting body (2, 2', 102, 202) and on the wearing plate (3, 103, 203) in the direction (31) bringing them closer together, at the same time maintaining said orientation of said longitudinal face (8, 8', 108, 208) of the mounting body (2, 2', 102, 202), in order to bring about a migraton of said material of said fused sheet (25) between the mutually juxtaposed said rebates (9, 10, 9', 10', 109, 110, 209, 210) and said edges (6, 7, 106, 107, 206, 207) in the form of a continuous longitudinal face (5, 8, 8', 105, 108, 205, 208) on the one hand, and between said rebates (9, 10, 9', 10', 109, 110, 209, 210) and said edges (6, 7, 106, 107, 206, 207) on the other hand, (d) and solidifying said continuous longitudinal film (14, 114, 214) by cooling while maintaining said stress, in order to anchor said film continuously to the mounting body (2, 2', 102, 202) and to the wearing plate (3, 103, 203) and to fix these mutually by means of said film (14, 114, 214), and then cancelling said stress.

2. The process as claimed in claim 1, wherein, between steps a) and b), a treatment intended to make it easier to anchor by fusion the material of said sheet (25) is applied to at least one of the mounting body (2, 2', 102, 202) and the wearing plate (3, 103, 203) on said respective longitudinal face (5, 8, 8', 105, 108, 205, 208) and on at least one of said rebates (9, 10, 9', 10', 109, 110, 209, 210) and said edges (6, 7, 106, 107, 206, 207).

3. The process as claimed in claim 1, wherein, between steps a) and b), a treatment, for increasing the likelihood of anchoring by fusion the material of said sheet, is applied to at least one of said longitudinal face of the mounting body and said longitudinal face of the wearing plate, and on at least one of said rebates and said edges.

4. The process as claimed in any one of claims 1 and 2, wherein the mounting body (2, 2', 102, 202), the wearing plate (3, 103, 203) and said sheet (25) are metallic.

5. The process as claimed in claim 4, wherein further applying, between steps a) and b), an anchoring covering for said soft solder to said longitudinal faces (5, 8, 8', 105, 108, 205, 208), said rebates (9, 10, 9', 10', 109, 110, 209, 210) and said edges (6, 7, 106, 107, 206, 207), and wherein the mounting body (2, 2', 102, 202) is made of aluminum, wherein the wearing plate (3, 103, 203) is made of stainless steel, wherein said sheet (25) is made of soft solder.

6. The process as claimed in claim 4, wherein further applying, between steps a) and b), an anchoring covering for said soft solder to said longitudinal faces (5, 8, 8', 105, 108, 205, 208), said rebates (9, 10, 9', 10', 109, 110, 209, 210) and said edges (6, 7, 106, 107, 206, 207), and wherein the mounting body (2, 2', 102, 202) is made of aluminum, wherein the wearing plate (3, 103, 203) is made of cooper, wherein said sheet (25) is made of soft solder.

7. The process as claimed in claim 4, wherein further applying between steps a) and b), an anchoring covering for said soft solder to said longitudinal faces (5, 8, 8', 105, 108, 205, 208), said rebates (9, 10, 9', 10', 109, 110, 209, 210) and said edges (6, 7, 106, 107, 206, 207), and wherein the mounting body (2, 2', 102, 202) is made of aluminum, wherein the wearing plate (3, 103, 203) is made of brass, wherein said sheet (25) is made of soft solder.

8. The process as claimed in claim 4, wherein further applying between steps a) and b), an anchoring covering for said soft solder to said longitudinal faces (5, 8, 8', 105, 108, 205, 208), said rebates (9, 10, 9', 10', 109, 110, 209, 210) and said edges (6, 7, 106, 107, 206, 207), and wherein the mounting body (2, 2', 102, 202) is made of aluminum alloy, wherein the wearing plate (3, 103, 203) is made of stainless steel, wherein said sheet (25) is made of soft solder.

9. The process as claimed in claim 4, wherein further applying between steps a) and b), an anchoring covering for said soft solder to said longitudinal faces (5, 8, 8', 105, 108, 205, 208), said rebates (9, 10, 9', 10', 109, 110, 209, 210) and said edges (6, 7, 106, 107, 206, 207), and wherein the mounting body (2, 2', 102, 202) is made of aluminum alloy, wherein the wearing plate (3, 103, 203) is made of copper, wherein said sheet (25) is made of soft solder.

10. The process as claimed in claim 4, wherein further applying between steps a) and b), an anchoring covering for said soft solder to said longitudinal faces (5, 8, 8', 105, 108, 205, 208), said rebates (9, 10, 9', 10', 109, 110, 209, 210) and said edges (6, 7, 106, 107, 206, 207), and wherein the mounting body (2, 2', 102, 202) is made of aluminum alloy, wherein the wearing plate (3, 103, 203) is made of brass, wherein said sheet (25) is made of soft solder.

11. The process as claimed in claim 4, wherein, during step c), said heating is carried out by high-frequency induction.

12. The process as claimed in claim 11, wherein said longitudinal faces (5, 8) are plane.

13. The process as claimed in claim 11, wherein said longitudinal faces (5, 8') are of a general plane form, and wherein at least a first (8') of said longitudinal faces (5, 8') carries reliefs (37) having a predetermined height (E) from said first (8') of said longitudinal faces (5, 8') and coming in contact with the second (5) of said longitudinal faces (5, 8'), at the same time being embedded in said material of said fused sheet (25) during step c), so as to give said film (14) a thickness equal to said predetermined height (E) between said longitudinal faces (5, 8'), during step d).

14. The process as claimed in claim 13, wherein said rebates (9, 10, 9', 10', 109, 110, 209, 210) and said edges (6, 7, 106, 107, 206, 207) have the same dimension (h, e) from said longitudinal face (8, 8', 5, 108, 105, 208, 205) of the mounting body (2, 2', 102, 202) or of the wearing plate (3, 103, 203) respectively.

15. The process as claimed in claim 14, wherein each rebate (9, 10, 9', 10', 109, 110, 209, 210) has, from said longitudinal face (8, 8', 108, 208) of the mounting body (2, 2', 102, 202), a dimension (h) at most approximately equal to the dimension (e) which the corresponding edge (106, 107, 206, 207) has from said longitudinal face (5, 105, 205) of the wearing plate (3).

16. The process as claimed in claim 15, wherein, between steps b) and d) said rebates (9, 10, 9', 10', 109, 110, 209, 210) are deformed toward said edges (6, 7, 106, 107, 206, 207), in such a way that said rebates (9, 10, 9', 10', 109, 110, 209, 210) have, opposite said longitudinal face (8, 8', 108, 208) of the mounting body (2, 102, 202), a respective continuous longitudinal margin (15, 16, 15', 16') in direct transverse pinching contact with said edges (6, 7, 106, 107, 206, 207) respectively.

17. The process as claimed in claim 16, wherein, during step a), said edges (6, 7, 106, 107, 206, 207) are given a shape favorable to a relative immobilization of the wearing plate (3) and mounting body (2, 2', 102, 202) by gripping as a result of said direct transverse pinching contact.

18. The process as claimed in claim 17, wherein said shape comprises a dovetail profile.

19. The process as claimed in claim 17, wherein said shape comprises a knurled profile.

20. The process as claimed in claim 17, wherein said shape comprises a serrated profile.

21. The process as claimed in claim 17, wherein the mounting body (2, 2', 102, 202) possesses two longitudinal rims (11, 12, 11', 12'), each of which defines respectively one of said rebates (9, 10, 9', 10', 109, 110, 209, 210).

22. The process as claimed in claim 21 wherein, during step b), the respective longitudinal faces (8, 8', 5) of a single mounting body (2), on the one hand, and of a plurality of longitudinally juxtaposed wearing plates (3', 3") defining longitudinal plays (17) between them, on the other hand, are mutually superposed with the interposition of said sheet (25).

23. A process for producing an electrical supply rail wherein said rail includes two longitudinal, metallic, electrically conductive components, a mounting body and a wearing plate, bound together through fusion of a sheet of electrically conductive material, said process comprising the steps of:
 (a) producing the mounting body and the wearing plate by fashioning, on the mounting body, two continuous longitudinal rebates bordering a respective longitudinal face of said mounting body, and on the wearing plate, two continuous longitudinal edge bordering a respective longitudinal face of the wearing plate;
 (b) interposing said sheet of electrically conductive material between said longitudinal face of the mounting body and said longitudinal face of the wearing plate, said sheet having a fusion temperature below the mounting body and the wearing plate, and capable of being anchored by fusion to the mounting body and to the wearing plate, by mutually juxtaposing said rebates and said edges transversely and by orienting said longitudinal face of the mounting body upwards in an approximately horizontal mean orientation;
 (c) causing the fusion of said sheet by heating and exerting a stress on the mounting body and on the wearing plate to adhere said mounting body and said wearing plate so as to produce a continuous longitudinal film, said continuous longitudinal film solders the mounting body to said wearing plate, and excess film is retained between the rebates and the edges;
 (d) and solidifying said continuous longitudinal film by cooling while maintaining said stress, in order to anchor said film continuously to the mounting body and to the wearing plate so as to adhere said mounting body to said wearing plate, and then cancelling said stress.

* * * * *

UNITED STATES PATENT AND TRADEMARK OFFICE
CERTIFICATE OF CORRECTION

PATENT NO. : 5,126,514
DATED : 06/30/92
INVENTOR(S) : Bommart

It is certified that error appears in the above-identified patent and that said Letters Patent is hereby corrected as shown below:

| | | |
|---|---|---|
| col. 11, line 55 | delete " 10" " | insert --10'-- |
| col. 15, line 56 | after "longitudinal" | insert --film (14, 114, 214) interposed between said longitudinal-- |
| col. 16, line 21 | delete " 8', " | |
| col. 16, line 30 | delete " 8', " | |
| col. 16, line 35 | delete " cooper" | insert --copper-- |
| col. 16, line 39 | delete " 8', " | |
| col. 16, line 48 | delete " 8', " | |
| col. 16, line 57 | delete " 8', " | |
| col. 16, line 66 | delete " 8', " | |
| col. 18, line 26 | delete "edge" | insert --edges-- |

Signed and Sealed this

Ninth Day of November, 1993

Attest:

BRUCE LEHMAN

*Attesting Officer*          *Commissioner of Patents and Trademarks*